United States Patent
Mitsuhiro (12) 
(10) Patent No.: US 6,702,392 B2
(45) Date of Patent: Mar. 9, 2004

(54) ROTARY FEED MECHANISM FOR DRIVING A SHAFT IN RESPONSE TO TURN OF A LEVER

(75) Inventor: Kazuso Mitsuhiro, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 55 days.

(21) Appl. No.: 10/024,013

(22) Filed: Dec. 21, 2001

(65) Prior Publication Data

US 2002/0084688 A1 Jul. 4, 2002

(30) Foreign Application Priority Data

Dec. 26, 2000 (JP) ........................................ 2000-394833

(51) Int. Cl.[7] .............................................. A47B 97/00
(52) U.S. Cl. .................................. 297/463.1; 74/813 R
(58) Field of Search ........................ 297/463.1, 344.12, 297/344.15; 74/813 R, 816, 63

(56) References Cited

U.S. PATENT DOCUMENTS 4,993,678 A * 2/1991 Easter
6,464,193 B1 * 10/2002 Nemoto

FOREIGN PATENT DOCUMENTS

| DE | 44 36 096 | 4/1996 |
| DE | 44 46 741 | 6/1996 |
| DE | 197 25 899 | 12/1998 |
| JP | 7-19562 | 4/1995 |
| JP | 2000-118273 | 4/2000 |

\* cited by examiner

Primary Examiner—Milton Nelson, Jr.
(74) Attorney, Agent, or Firm—Wenderoth, Lind & Ponack, L.L.P.

(57) ABSTRACT

A rotary feed mechanism includes a ratcheting mechanism intervening between an operating lever and a brake drum and operable to permit rotation of an input shaft only when the operating lever is angularly moved from the neutral position in any one of the first and second directions, but to lock the input shaft during angular movement of the operating shaft back to the neutral position. The ratcheting mechanism includes a lock gear having gear teeth and mounted on the input shaft for rotation together therewith, an indexing plate movable angularly between an engaged position, in which the indexing plate is engaged with some of the gear teeth of the lock gear, and a disengaged position, in which the indexing plate is disengaged from some of the gear teeth of the lock gear, about an axis lying substantially perpendicular to a longitudinal axis of the input shaft, and a release mechanism carried by the brake drum for releasing the indexing plate from the engaged position to allow the operating lever to be returned to the neutral position.

4 Claims, 9 Drawing Sheets

ROTARY FEED MECHANISM FOR DRIVING A SHAFT IN RESPONSE TO TURN OF A LEVER

BACKGROUND OF THE INVENTION

1. Field of the Invention

The present invention relates generally to a rotary feed mechanism for intermittently driving a shaft in response to repeated turn of an operating element and, in particular but not exclusively, to the rotary feed mechanism for use suitably in incrementally adjusting the height of an automobile seat assembly above an automobile in-compartment floor in response to reciprocate turn of a seat adjustment handle between a neutral position and one of highest and lowest positions opposite to each other with respect to the neutral position.

2. Description of the Related Art

The use of the rotary feed mechanism in automobile seat height adjustment has been well known and is disclosed in, for example, Japanese Laid-Open Patent Publication No. 2000-118273. This known rotary feed mechanism is used in combination of a seat height adjustment mechanism including a pair of parallel link mechanisms that are driven in unison with each other to elevate or lower the automobile seat assembly relative to the automobile in-compartment floor. The rotary feed mechanism disclosed therein is used to drive the parallel link mechanisms in unison with each other for the intended purpose and includes an operating lever or handle pivotally mounted on one of opposite side seat frames on which a seat cushion is fixedly mounted, for movement between a neutral position and one of highest and lowest positions corresponding respectively to the highest and lowest available seat positions above the automobile in-compartment floor. When the operating lever is turned repeatedly from the neutral position towards the highest or lowest position, the seat cushion can be elevated or lowered incrementally, respectively.

The known rotary feed mechanism is interposed between the axis of pivot of the operating lever and a drive shaft drivingly coupled with one of the parallel link mechanisms and also includes a one-way brake drum carried by that one of the side seat frames and having input and output shafts, and a ratchet mechanism operatively intervening between the brake drum and the operating lever. The brake drum is designed to allow the output shaft to rotate only in response to rotation of the input shaft in either one of directions opposite to each other, but to prevent the input shaft from rotating in response to a force acting on the output shaft to rotate the output shaft. The output shaft of the brake drum may either be the drive shaft for driving one of the parallel link mechanisms or be drivingly coupled with such drive shaft.

The ratchet mechanism referred to above includes a ratchet gear fixedly mounted on the input shaft for rotation together therewith and a pair of ratchet paw) members that are selectively brought into engagement with the ratchet gear one at a time, depending on whether the operating lever is turned from the neutral position towards the highest position or whether it is towards the lowest position, so that the pivot of the operating lever can be transmitted to the input shaft.

In order to elevate or lower the automobile seat cushion a maximum available distance towards the highest or lowest available seat position, the operating lever has to be repeatedly turned in forward-going and rearward-going directions from the neutral position towards the highest or lowest positions to incrementally elevate or lower the seat cushion. While the forward-going turn of the operating lever results in engagement of one of the ratchet pawl members with one of gear teeth of the ratchet gear to thereby rotate the ratchet gear in response to the forward-going turn of the operating lever, the rearward-going turn of the operating lever as biased by a biasing spring used to return and hold the operating lever to the neutral position allows the respective ratchet pawl member to override some of the gear teeth of the ratchet gear while clicking those gear teeth one after another until the operating lever returns to the neutral position, accompanied by generation of obnoxious clicking noises. The clicking noises are indeed harsh and uncomfortable to hear.

SUMMARY OF THE INVENTION

The present invention has been developed to overcome the above-described disadvantages and is intended to provide an improved rotary feed mechanism which is substantially free from generation of the obnoxious noises and which can be assembled with a minimized number of component parts.

In order to accomplish the foregoing object, the present invention provides a rotary feed mechanism which includes a brake drum having input and output shafts and operable to drivingly couple the input and output shafts together to rotate the input and output shafts in unison with each other only when the input shaft is driven regardless of the direction in which the input shaft is rotated; an operating lever mounted on the input shaft of the brake drum and supported for rotation from a neutral position in first and second directions opposite to each other about a longitudinal axis of the input shaft; and a ratcheting mechanism intervening between the operating lever and the brake drum and operable to permit rotation of the input shaft only when the operating lever is angularly moved from the neutral position in any one of the first and second directions, but to lock the input shaft during angular movement of the operating shaft back to the neutral position. The ratcheting mechanism in turn includes a lock gear having gear teeth and mounted on the input shaft for rotation together therewith; an indexing plate movable angularly between an engaged position, in which the indexing plate is engaged with some of the gear teeth of the lock gear, and a disengaged position, in which the indexing plate is disengaged from some of the gear teeth of the lock gear, about an axis lying substantially perpendicular to a longitudinal axis of the input shaft, and a release mechanism carried by the brake drum for releasing the indexing plate from the engaged position to allow the operating lever to be returned to the neutral position.

According to the present invention, since the lock gear is positioned externally of the brake drum and the movement of the indexing plate between the engaged and disengaged positions takes place in a direction generally perpendicular to the input shaft, there is no way of the indexing plate overriding some of the gear teeth during the return movement of the operating lever back to the neutral position while clicking those gear teeth one after another until the operating lever returns to the neutral position. Accordingly, the rotary feed mechanism according to the present invention is substantially quiet and substantially free from generation of the obnoxious clicking noises.

In one preferred embodiment of the present invention, the rotary feed mechanism preferably includes a biasing spring for normally urging the indexing plate to the engaged position to allow the angular movement of the operating lever to be transmitted to the input shaft through the lock gear. In this case, the release mechanism being operable against the biasing spring to release the indexing plate. The indexing plate may be supported by the operating lever by means of a support shaft defining such axis substantially perpendicular to the input shaft and has an array of parallel catch slots defined therein for engagement with some of the gear teeth of the lock gear. The release mechanism preferably includes a guide means for guiding the indexing plate to permit some of the gear teeth to be engaged in the corresponding catch slots during the angular movement of the operating lever in one of the first and second directions from the neutral position, but to be disengaged from the catch slots during the angular movement of the operating lever back to the neutral position.

In another preferred embodiment of the present invention, the indexing plate has a finger extending therefrom in a direction laterally of a plane of rotation of the lock gear and towards the release mechanism. The guide means includes a second biasing spring, a cam element urged in one direction by the second biasing spring and pivotable against the second biasing spring upon engagement with the finger during the angular movement of the operating lever from the neutral position to permit the indexing plate to be angularly moved from the engaged position, said first cam member being returned back to an initial position by the second biasing spring in response to return of the operating lever back towards the neutral position, and a guide element engageable with the finger during a return movement of the operating lever back to the neutral position to keep the indexing plate at the disengaged position. The second biasing spring preferably has a biasing force greater than that of the first biasing spring.

In any event, the rotary feed mechanism of the present invention can be used in association with a seat height adjusting mechanism for adjustably elevating or lowering a seat assembly relative to a floor. In this case, the output shaft of the brake drum is drivingly coupled with the seat height adjusting mechanism.

BRIEF DESCRIPTION OF THE DRAWINGS

The present invention will become readily understood from the following description of preferred embodiments thereof made with reference to the accompanying drawings, in which like parts are designated by like reference numeral and in which:

FIGS. 6A and 6B illustrate the sequence of operation of the rotary feed mechanism, wherein

FIGS. 7A and 7B illustrate the subsequent sequence of operation of the rotary feed mechanism, wherein

FIGS. 8A and 8B illustrate a second embodiment of a mesh engaging/disengaging mechanism according to the present invention, wherein FIGS. 9A and 9B illustrate a third embodiment of a ratcheting mechanism according to the present invention, wherein

DESCRIPTION OF THE EMBODIMENTS

This application is based on an application No. 2000-394833 filed Dec. 26, 2000 in Japan, the content of which is herein expressly incorporated by reference in its entirety.

Before the description proceeds, it is to be noted that terms "front", "rear", "left" and "right" referred to in this specification are used to denote orientation relative to an automobile body structure and also to the position of a driver occupying a seat assembly.

Figure 1:
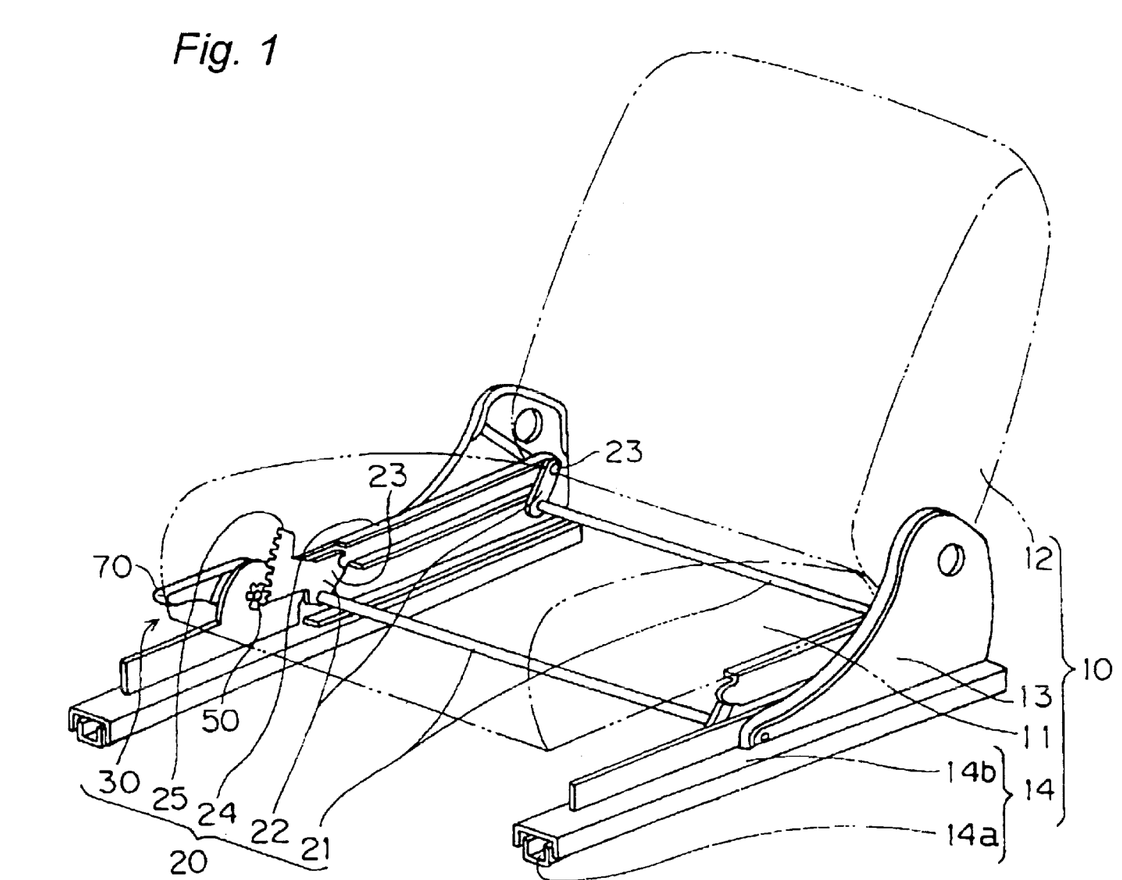
FIG. 1 is a perspective view of an automobile seat assembly incorporating a rotary feed mechanism according to a first embodiment of the present invention for adjusting the height of the seat assembly above an automobile in-compartment floor.

FIG. 1 depicts a seat height adjusting mechanism 20 to which a rotary feed mechanism according to the present invention is applied. As shown therein, a seat assembly 10 includes a seat cushion 11, a seat back 12, a pair of spaced side frames 13 for supporting the seat cushion 11 indirectly as will be described later and for pivotally supporting the seat back 12 directly, and a pair of slide rail assemblies 14 for moving the side frames 13 and, hence, the seat assembly 10 in a longitudinal direction of an automobile body structure. Each of the slide rail assemblies 14 include a lower rail 14a fixed to an automobile in-compartment floor and an upper rail 14b mounted on the lower rail 14a for telescopic sliding motion relative to the lower rail 14a in a direction lengthwise thereof. The side frames 13 are mounted on the associated upper rails 14b for movement together therewith so that the position of the seat assembly 10 relative to an automobile steering wheel can be adjusted by means of any known seat slide adjustment (not shown). It is to be noted that the seat slide adjustment for adjustably locking the seat assembly 10 relative to the automobile steering wheel does not constitute subject matter of the present invention and is therefore neither described nor shown, but for the purpose of this description of the present invention, the seat assembly 10 is assumed to be locked at a selected position.

The seat height adjusting mechanism 20 for adjusting the height of the seat cushion 11 relative to the automobile in-compartment floor is disposed generally below the seat cushion 11 and between the left and right side frames 13. The seat height adjusting mechanism 20 includes front and rear rods 21 extending between and perpendicular to the left and right side frames 13 with their opposite ends connected pivotally to the left and right side frames 13, respectively; front left and right links 22 fixedly mounted respectively on the opposite ends of the front rod 21 so as to extend generally upwardly therefrom; rear left and right links 22 (one of which is not visible in FIG. 1) fixedly mounted respectively on the opposite ends of the rear rod 21 so as to extend generally upwardly therefrom; and left and right seat cushion frames 24 each having opposite ends mounted on upper ends of the front and rear links 22 via link pins 23, respectively, so as to be rotatable about the link pins 23. It will readily be seen that the front and rear rods 21 connected at their opposite ends to the left and right side frames 13, the front and rear links 22, and the left and right seat cushion frames 24 each linked with the left or right side frame 13 through the front or rear links 22 by way of the front or rear rod 21 altogether form two parallel link mechanisms, each on one side of the seat cushion 11, which are operated in unison with each other to elevate or lower the seat assembly 10 relative to the automobile in-compartment floor. So far in the illustrated embodiment, the seat cushion 11 is mounted on the left and right side frames 13 through the left and right seat cushion frames 24 that form parts of the respective parallel link mechanisms and that the length of the links 22 is determinative of the extent to which the height of the seat assembly 10 above the automobile in-compartment floor can be adjusted.

The seat height adjusting mechanism 20 also includes a sector gear 25 protruding forwardly from one (the left side one in the example shown in FIG. 1) of the front links, that is, the front right link 22, and a rotary feed mechanism 30 according to the present invention. The rotary feed mechanism 30 is mounted on one of the side frames 13 and has a gear held in mesh with the sector gear 25 as will be described in more detail.

The rotary feed mechanism 30 includes an operating lever 70 and an output drive shaft 50 on which the gear meshed with the sector gear 25 is mounted for rotation together therewith. Specifically, the rotary feed mechanism is so designed and so configured that as the operating lever 70 is pulled upwards from a neutral position towards a highest position or pushed downwards from the neutral position towards a lowest position opposite to the highest position, the gear on the output drive shaft 50 and meshed with the sector gear 25 is driven about the longitudinal axis of the shaft 50, accompanied by a pivotal movement of the sector gear 25 about the front rod 21. The pivotal motion of the sector gear 23 results in deformation of the parallel link mechanisms in unison with each other with the seat cushion frames 24 and, hence, the seat cushion 11 consequently moved up or down depending on the direction in which the operating lever 70 is moved from the neutral position.

Figure 2:
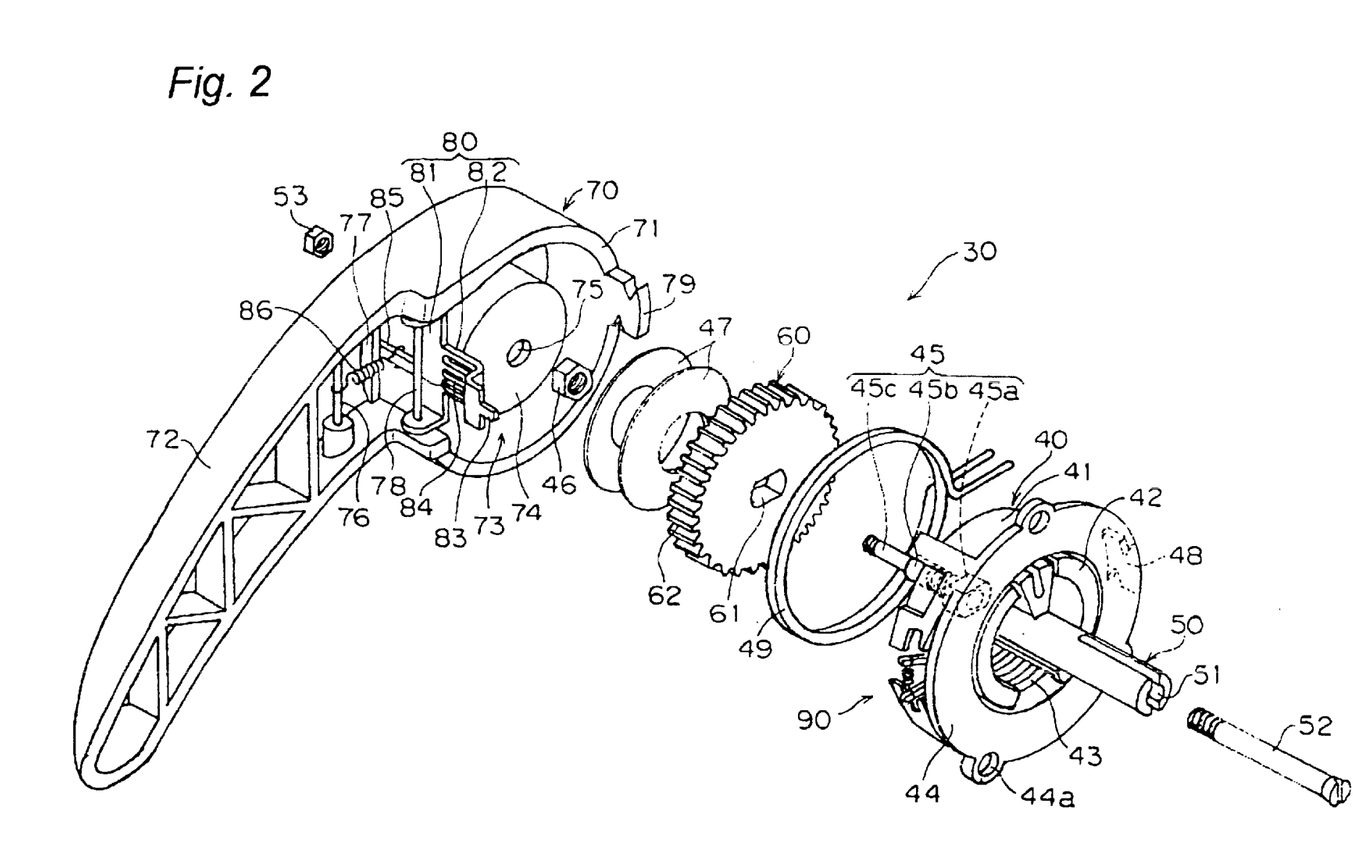
FIG. 2 is an exploded perspective view of a rotary feed mechanism shown in FIG. 1.
Figure 3:
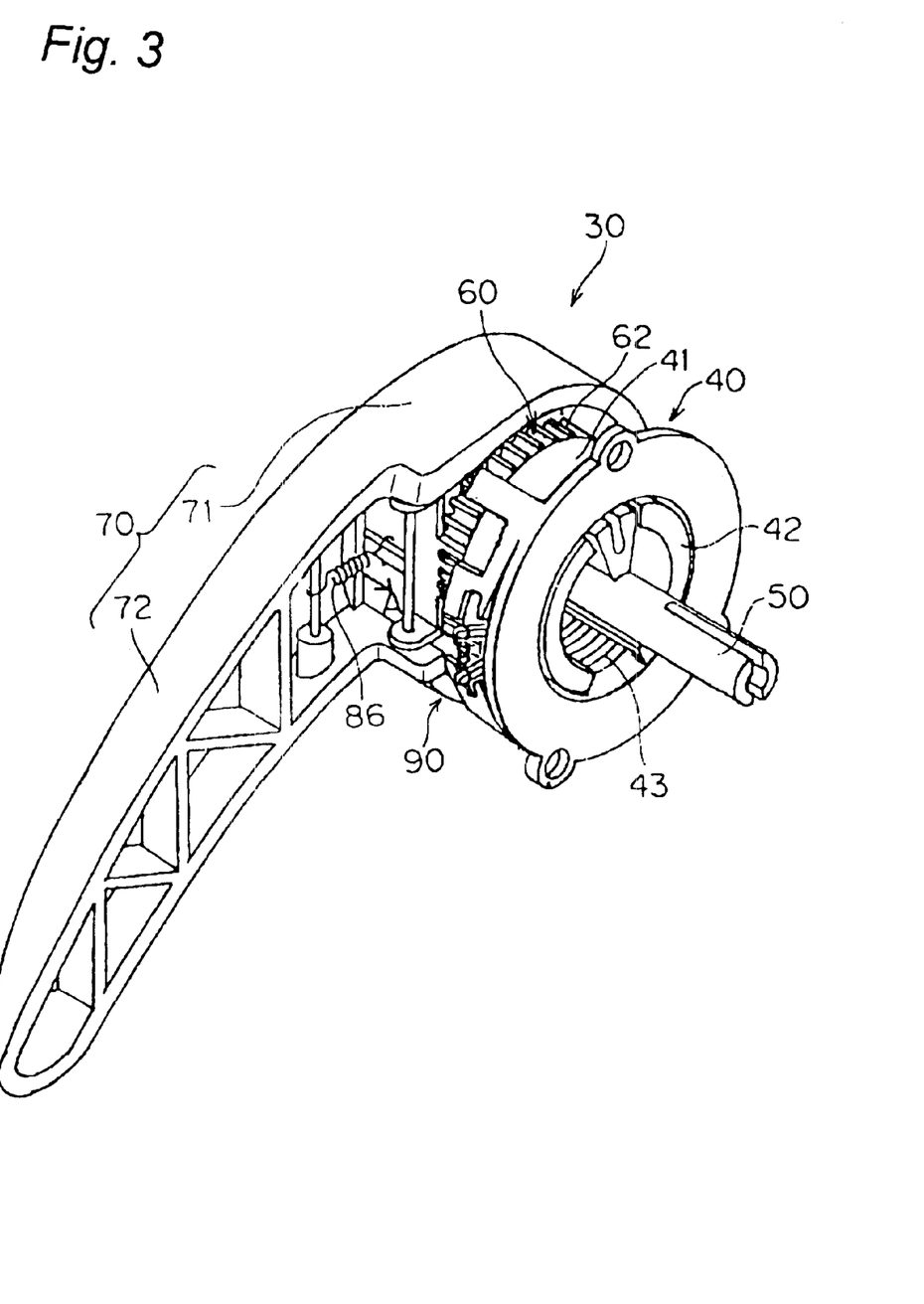
FIG. 3 is an assembled perspective view of the rotary feed mechanism shown in FIG. 2.

Referring now to FIGS. 2 and 3, the rotary feed mechanism 30 includes a generally cup-shaped brake drum 40 fixed to an outer side face of one of the side frames, that is, the right side frame 13, and having the output drive shaft 50 incorporated coaxially therein, a lock gear 60 placed concentrically on a bottom face of the brake drum 40, a indexing member 80 generally intervening between the operating lever 70 and the lock gear 60 and operable to selectively connect or disconnect the operating lever 70 with or from the lock gear 60, and a release mechanism 90 operatively mounted on the brake drum 40 for selectively engaging or disengaging the indexing member 80 with or from the lock gear 60 as will be detailed later. The indexing member 80 and the release mechanism 90 altogether form a ratcheting mechanism.

Figure 4:
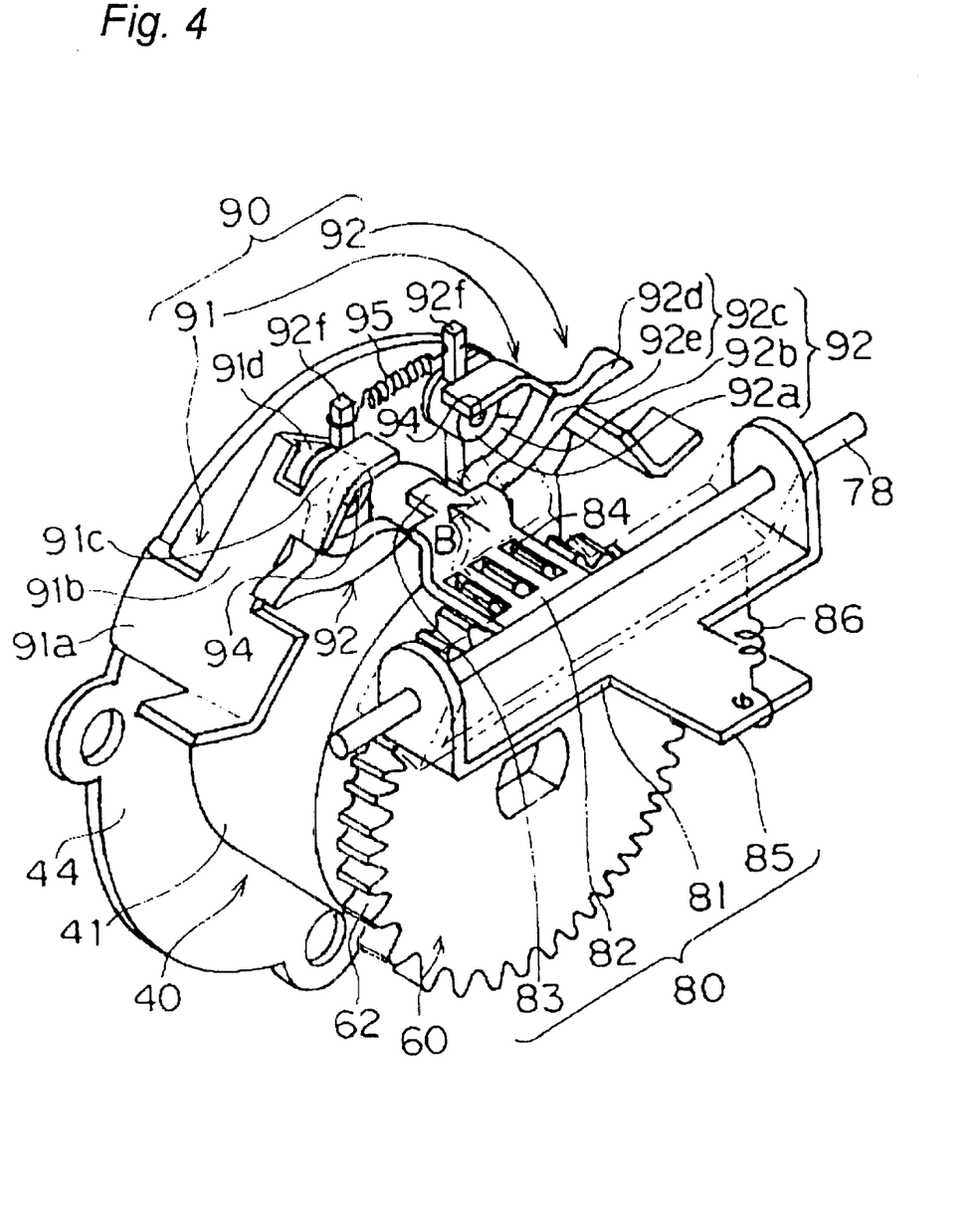
FIG. 4 is a partially enlarged view of a ratcheting mechanism as viewed in a direction shown by the arrow A in FIG. 3.

As best shown in FIGS. 2 to 4, the brake drum 40 includes an outer cylinder 41, an inner cylinder 42 fitted inside the outer cylinder 41 to define an annular spring chamber therebetween, and a coiled braking spring 43 accommodated coaxially within the spring chamber between the inner cylinder 42 and the outer cylinder 41 and held in part with an inner peripheral surface of the outer cylinder 41 and in part with an outer peripheral surface of the inner cylinder 42. The output drive shaft 50 is concentrically disposed within the inner cylinder 42 and coupled thereto for rotation together therewith.

This brake drum 40 is so structured that, when the inner cylinder 42 is rotated by the lock gear 60 in a manner as will be described later, the coil diameter of the brake spring 43 decreases slightly, thus allowing the inner cylinder 42 to rotate about the output drive shaft 50 in frictional contact with the brake spring 43, but when the output drive shaft 50 is turned, the coil diameter of the brake spring 43 increases with turns of the brake spring 43 consequently brought into frictional contact with the inner peripheral surface of the outer cylinder 41 to thereby halt the output drive shaft 50 from being further turned about its own longitudinal axis. In other words, the brake drum 40 is so designed that the output drive shaft 50 can be turned when the lock gear 60 is rotated by manipulation of the operating lever 70, but cannot be turned when a turning force is applied directly to the output drive shaft 50. The brake drum 40 discussed above may be of any known structure and may be the one disclosed in the JP Laid-open Utility Model Publication No. 7-19562.

The outer cylinder 41 of the brake drum 40 has an annular flange 44 extending radially outwardly from one of opposite ends thereof adjacent the side frame 13 and having a plurality of circumferentially spaced bolt holes 44a defined therein. The brake drum 40 is carried by the side frame 13 with the annular flange 44 bolted or screwed thereto by means of bolts or screws extending though the respective bolt holes 44a.

The inner cylinder 42 has an input shaft 45 coaxially extending through a central hole defined in a bottom plate of the outer cylinder 41. The input shaft 45 is secured to the inner cylinder 42 for rotation together therewith and has a key shaft portion 45a, an externally helically threaded large-diameter shaft portion 45b and an externally helically threaded small-diameter shaft portion 45c formed in this order from the bottom plate of the outer cylinder 41. The key shaft portion 45a is of a generally rectangular sectioned configuration defined by removing circumferentially opposite side portions thereof and is adapted to be engaged in a correspondingly shaped center hole 61 defined in the lock gear 60 for rotation together therewith.

The lock gear 60 has a diameter substantially equal to that of the outer cylinder 41 of the brake drum 40. The lock gear 60 has, in addition to the generally rectangular center hole 61, a plurality of circumferentially equally spaced teeth 62 formed on the entire outer periphery thereof. With the key shaft 45a of the input shaft 45 inserted into the center hole 61, a nut 46 is threaded onto the large-diameter shaft portion 45b to thereby secure the lock gear 60 to the inner cylinder 42 for rotation together therewith. For the purpose which will become clear from the subsequent description, one end portion of the input shaft 45 adjacent the bottom plate of the inner cylinder 42, particularly the rectangular sectioned key shaft 45a, is formed with a coaxially inwardly extending screw hole.

The output drive shaft 50 is in the form of a quill shaft having a central hole 51 defined therein so as to extend coaxially therethrough and in alignment with the screw hole in that end portion of the input shaft 45. A stopper shaft 52 is inserted through the central hole 51 of the output drive shaft 50 and is then threaded into the screw hole in that end portion of the input shaft 45 so that the output drive shaft 50 can be mounted inside the inner cylinder 42 for rotation together therewith about the stop shaft 52.

The operating lever 70 is of one-piece molded structure including a generally round gear casing 71 for accommodating therein the lock gear 60 and a handle 72 extending radially outwardly from the gear casing 71. The gear casing 71 has a recess 73 defined therein and having an inside diameter slightly greater than the outside diameter of the lock gear 60. A bottom plate 74 of the gear casing 71 has a central hole 75 defined therein, into which the small-diameter shaft portion 45c of the input shaft 45 is inserted via two spring washers 47. A lock nut 53 is fastened to a free end of the small-diameter shaft portion 45c that extends outwardly from the bottom plate 74 to thereby causes the brake drum 40 and the lock gear 60 to be assembled together within the recess 73 of the gear casing 71.

With the brake drum 40 and the lock gear 60 coupled with to the operating lever 70, the spring washers 47 are compressed and elastically deformed to exert an biasing force acting in axial directions counter to each other along the input shaft 45 to thereby avoid loosening and/or rattling of any of the brake drum 40, the lock gear 60 and the operating lever 70.

The operating lever 70 has a spring-receiving tab 79 protruding from an appropriate position on an outer periphery of the gear casing 71 toward the annular flange 44 integral with the outer cylinder 41 of the brake drum 40. This annular flange 44 is also provided with a spring-receiving tab 48 at a location generally aligned with the spring-receiving tab 79. These spring-receiving tabs 48 and 79 are so positioned as to overlap with each other when and so long as the operating lever 70 is held at the neutral position intermediate between the highest and lowest positions as will be described later.

With both the spring-receiving tabs 48 and 79 are overlapping with each other when the operating lever 70 is in the neutral position, a return spring 49 in the form of a large-diameter coil spring is mounted externally on the outer cylinder 41 of the brake drum 40 with opposite ends of return spring 49 positioned on respective sides of the overlapping spring-receiving tabs 48 and 79 such that, even when the handle 72 is manipulated in any direction from the neutral position towards the highest or lowest position with the spring-receiving tab 79 angularly moving relative to the spring-receiving tab 48, the spring-receiving tabs 48 and 79 can move in respective directions away from each other with the return spring 49 consequently accumulating an biasing force necessary to return the operating lever 70 back to the neutral position. Thus, the return spring 49 serves to ensure that the operating lever 70 can be tended to return to the neutral position once the operating lever 70 has been moved in any direction about the input shaft 45.

The indexing member 80 forming a part of the ratcheting mechanism includes a generally U-shaped pate 81 pivotally carried by the operating lever 70 at a location adjacent a boundary between the gear casing 71 and the handle 72 by means of a supporting shaft 78, lying substantially perpendicular to the input shaft 45, and having a generally elongated body and upright arms on opposite ends of the elongated body, an indexing plate 82 protruding from an intermediate portion of the elongated body of the U-shaped plate 81 so as to extend toward the lock gear 60, and a finger 83 extending outwardly from a free end of the indexing plate 82 towards the annular flange 44. The U-shaped plate 81 of the indexing member 80 is received in the recess 73 of the gear casing 71 adjacent the handle 72 by means of the supporting shaft 78 so that the indexing member 80 can be moved between engaged and disengaged positions about the supporting shaft 78 that extends pivotally through the upright arms of the U-shaped plate 81 with its free ends journalled to opposite portions of the wall defining the recess 73. This supporting shaft 78 so supported is positioned so as to extend in a direction generally tangential to the lock gear 60.

The indexing plate 82 has a plurality of, for example, three so far shown, catch slots 84 defined therein so as to extend parallel to each other in a direction transverse to the elongated body of the U-shaped plate 81. These catch slots 84 are arrayed in a direction conforming to the supporting shaft 78 and have the same pitch as the gear pitch of the teeth 62 of the lock gear 60. The U-shaped plate 81 also has a spring-receiving tab 85 protruding from an edge thereof remote from the indexing plate 82, and a first coil spring 86 in the form of a tension spring is interposed between such spring-receiving tab 85 and a corresponding spring-receiving pin 76, carried by the handle 72, to thereby urge the indexing plate 82 and, hence, the indexing member 80 about the supporting shaft 78 to assume the engaged position at all times.

With the indexing member 80 so urged towards the engaged position by the first coil spring 86, a distal end of the spring-receiving tab 85 is held in abutment with a partition wall 77 formed between the gear casing 71 and the handle 72, as shown in FIG. 2, so that a further rotation of the indexing member 80 about the supporting shaft 78 is prevented by the partition wall 77. In other words, the engaged position of the indexing plate 82 and, hence, the indexing member 80 is defined by the abutment between the spring-receiving tab 85 with the partition wall 77.

When the indexing member 80 is located at the engaged position, the indexing plate 82 is in position to allow some of the teeth 62 of the lock gear 60 to be engaged in the respective catch slots 84 as best shown in FIG. 3. Therefore, the angular movement of the handle 72 in either direction towards the highest or lowest position is transmitted through the indexing member 80 and the lock gear 60 to the inner cylinder 42 of the brake drum 40 to thereby drive the inner cylinder 42 about the output drive shaft 50, accompanied by rotation of the output drive shaft 50 in the same direction as the direction in which the handle 72 is turned.

Figure 5:
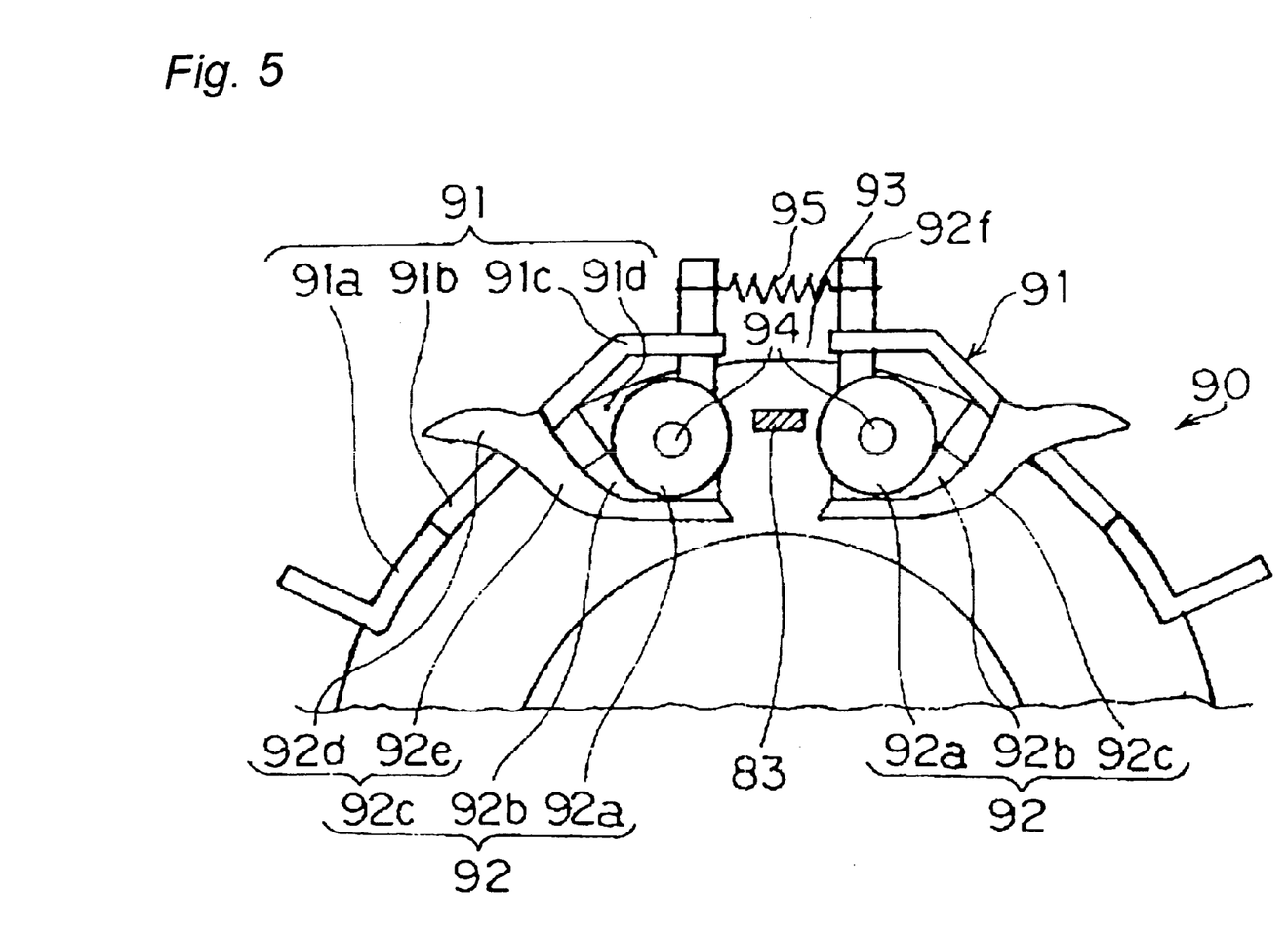
FIG. 5 is a view of a guide plate as viewed in a direction shown by the arrow B in FIG. 4.

With reference to FIGS. 4 and 5, the release mechanism 90 forming another part of the ratcheting mechanism will be explained in detail hereinafter. This release mechanism 90 is operable to selectively engage and disengage the indexing member 80 with and from the gear wheel 60 in response to reciprocating angular motion of the handle 72 so that the seat cushion 11 can be eventually elevated or lowered intermittently. FIG. 4 illustrates the ratcheting mechanism as viewed in a direction conforming to the direction of the arrow A in FIG. 3, and FIG. 5 illustrates the ratcheting mechanism as viewed in a direction conforming to the direction of the arrow B in FIG. 4.

As shown in these figures, the release mechanism 90 includes first and second guide plates 91 rigidly connected to, or otherwise formed integrally with, an outer peripheral edge of the annular flange 44 of the brake drum 40 and positioned on respective sides of the indexing member 80, and first and second cam members 92 cooperable with the respective first and second guide plates 91 to guide the finger 83 of the indexing member 80 in a manner which will be described later.

Each of the guide plates 91 includes a first support piece 91a extending in a direction laterally of the flange 44 of the brake drum 40 so as to overlay the outer cylinder 41, a second support piece 91b extending from a side edge of the first support piece 91a so as to lie perpendicular to the first support piece 91a, a cam piece 91c extending from a portion of a distal end of the second support piece 91b opposite to the first support piece 91a, and a carrier piece 91d extending from another portion of the distal end of the second support piece 91b so as to lie parallel to an annular face of the flange 44.

As clearly shown in FIG. 5, the first and second guide plates 91 are of the same structure and are so positioned as to assume a symmetrical relation with each other with respect to an axis extending radially and at right angles to the longitudinal axis of the brake drum 40. The first and second guide plates 91 both integral with the annular flange 44 are so positioned relative to each other that the respective cam pieces 91c of the first and second guide plates 91 can confront with each other with a gap 93 defined between distal ends of those cam pieces 91c. The gap 93 so defined is of a size sufficient to allow the finger 83 to pass therethrough as will be described later. The cam piece 91c of each of the first and second guide plates 91 defines a generally curved guide face along which the finger 83 of the indexing member 80 is slidingly guided.

Each of the first and second cam members 92 is movably carried by the carrier piece 91d of the associated guide plate 91 for movement between start and return positions. This carrier piece 91d is formed by bending a side edge of the second support piece 91b remote from the cam piece 91c toward the outer cylinder 41 of the brake drum 40. The first and second cam members 92 are of the same structure and each includes a boss 92a rotatably mounted on the associated carrier piece 91d by means of a pin 94 secured to the annular flange 44 so ad to protrude perpendicular to the flange 44 towards the brake drum 40, a generally triangular piece 92b extending from the boss 92a in a direction away from the cam piece 91c, an elongated guide piece 92c formed integrally with the respective triangle piece 92b at a location remote from the boss 92a, and a spring catch bar 92f protruded from the respective boss 92c in a direction opposite to the triangular piece 92b. A second coil spring 95 in the form of a tension spring is stretched between the spring catch bars 92f of the respective cam members 92 to draw the spring catch bars 92f in a direction close towards each other and, hence, to hold the cam members 92 at the start position as shown in FIGS. 4 and 5.

Each of the above-mentioned bosses 92a has a thickness (as measured in a direction parallel to the associated pin 94) sufficient to allow it to be positioned at a location nearer the outer cylinder 41 than the respective guide plate 91 and between the elongated guide piece 91c and an outer edge of the bearing piece 91d. The above-mentioned triangular piece 92b of each cam member 92 extends from an edge of the associated boss 92a adjacent the flange 44. The elongated guide piece 92c in each cam member 92 extends from a base portion (a lower edge as viewed in FIG. 5) of the triangular piece 92b towards a position opposing to the elongated guide piece 91c.

The elongated guide piece 92c in each of the cam members 92 has a generally flat guide face 92d and a generally inwardly curved guide face 92d continued radially inwardly from the flat guide piece 91c as viewed in FIG. 5, both of said guide faces 91d and 91e facing in a direction generally radially outwardly of the brake drum 40. The flat guide face 91d is held in continuance with the first guide piece 91c so long as the respective cam member 92 is held in the start position as shown, whereas the curved guide face 92e faces the adjacent boss 92a with its free end remote from the flat guide face 91 positioned closer to the outer cylinder 41 than to the finger 83.

The second coil spring 95 suspended between the spring catch bars 92f of the respective cam members 92 is of a type capable of exerting the biasing force greater than that of the above-mentioned first coil spring 86. It is to be noted that in determining the relationship between the respective biasing forces of the first and second coil springs 95 and 86 the moment of force is taken into consideration. Therefore, when the handle 72 is pulled or pushed towards the highest or lowest positions while the operating lever 70 is held at the neutral position, that is, the finger 83 of the indexing member 80 is located intermediate in the gap 93 between the first and second cam members 92 as shown in FIG. 5, the finger 83 is brought into engagement with the curved guide face 92e to thereby urge the corresponding elongated guide piece 92c towards the outer cylinder 41 with the respective cam member 92 pivoting about the associated pin 94 in a direction required for it to displace away from the cam piece 91c, whereby the finger 83 slidingly passes between the cam piece 91c and the curved guide face 92e to thereby assume a position in which it rests on the flat guide face 92d.

However, since the biasing force of the second coil spring 95 is greater than that of the first coil spring 86, the cam member 92 is pivoted about the associated pin 94 and then pushes up the finger 83, accompanied by displacement of the indexing plate 82 from the engaged position towards the disengaged position with some of the teeth 62 disengaging from the catch slots 84. In this condition, the flat guide face 92d is held generally in flush with the cam piece 91c.

When while in this condition the handle 72 once moved in one direction is moved in a direction counter to that one direction, the finger 83 is guided along the cam piece 91c toward a position immediately above the gap 9 and, then, returns to the initial position having moved through the gap 9 in a direction radially inwardly towards the brake drum 40 by the effect of the biasing force of the first coil spring 86, with the indexing member 82 consequently brought to the engaged position.

In any event, the operation of the rotary feed mechanism 30 embodying the present invention will now be described with reference to FIGS. 6A to 7B in combination with FIGS. 2 to 5. It is, however, to be noted that as can be clear from the foregoing description, whether the operating lever 70 is angularly moved towards the highest position to lower the seat cushion 11 down to the lowest available seat position or whether it is towards the lowest position to elevate the seat cushion 11 up to the highest available seat position, the handle 72 has to be cyclically turned to eventually rotate the output drive shaft 50 intermittently. FIGS. 6A to 7B illustrate how the ratcheting mechanism operates sequentially for each cycle of angular reciprocating motion of the handle 72 that is assumed to be operated to bring the seat cushion 11 towards the highest available seat position.

Figure 6A:
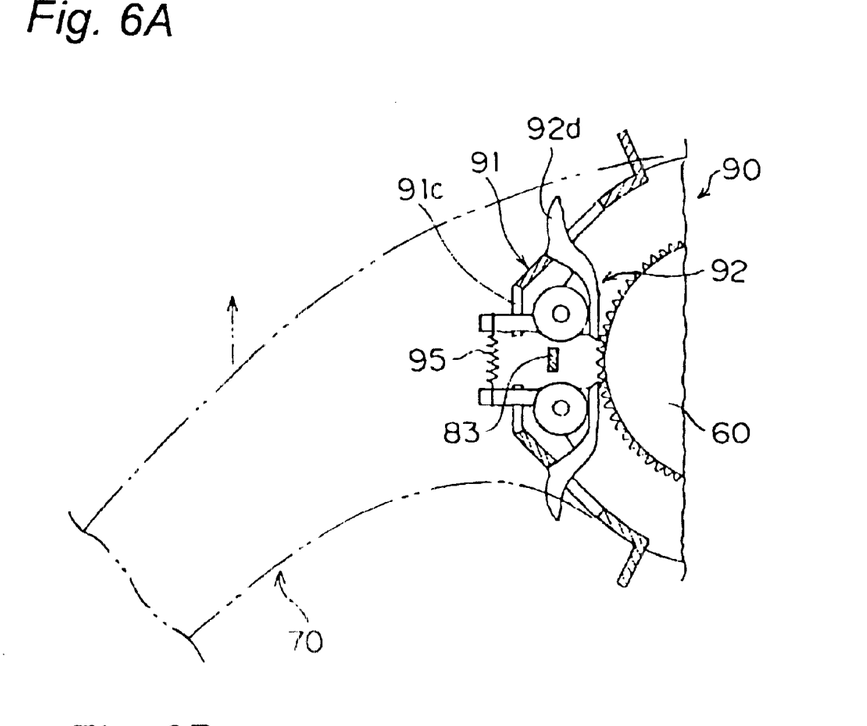
FIG. 6A shows a condition in which an operating lever is in a neutral position.

Assuming that as shown in FIG. 6A the operating lever 70 is held at the neutral position, the indexing plate 80 is held at the engaged position as urged by the first coil spring 86 with some of the teeth 62 of the lock gear 60 engaged in the corresponding catch slots 84 defined therein. In this condition, the lock gear 60 is locked in position unable to rotate about the output drive shaft 50. On the other hand, the first and second cam members 92 as urged clockwise and counterclockwise, respectively, as viewed in FIG. 6A, about the respective pins 64 by the second coil spring 95 are brought into abutment with respective heels of the corresponding cam pieces 91c, in which condition the flat guide faces of the first and second cam members 82 are continued respectively to the cam pieces 91c. On the other hand, the finger 83 integral with the indexing member 80 is positioned intermediate within the gap 93 between the first and second cam members 92.

Figure 6B:
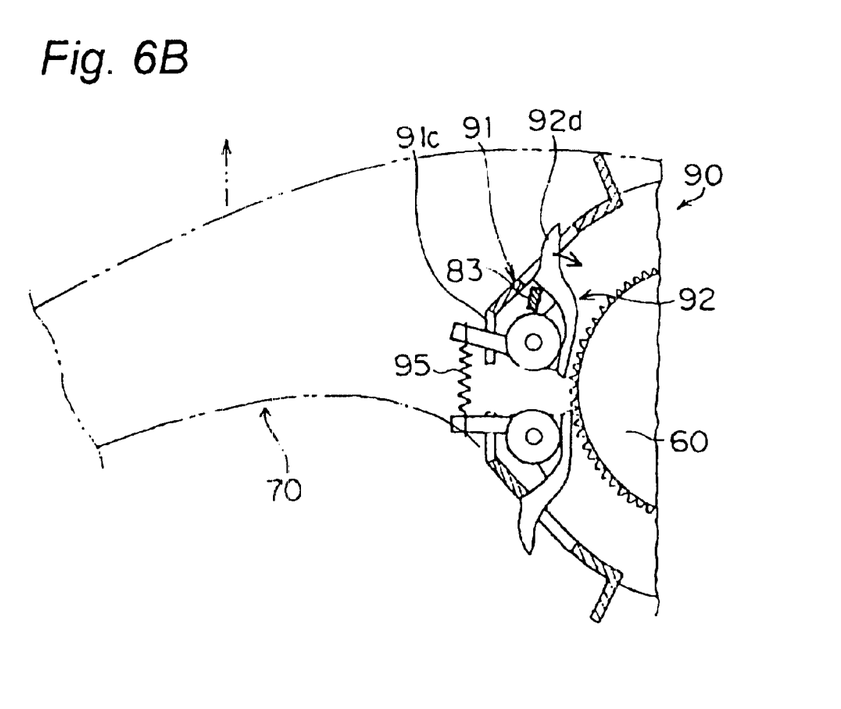
FIG. 6B shows a condition in which the operating lever is angularly moved in a forward-going direction towards a highest position.

Starting from this condition, and as the handle 72 is pulled upwards, that is, the operating lever 70 is pulled towards the highest position during a first half of the cycle, accompanied by a corresponding angular displacement of the indexing member 80, the lock gear 60 is driven clockwise about the input shaft 45 and, at the same time, the finger 83 is guided along the curved guide face 92e of the second cam member 92 towards the flat guide face 92d thereof as shown in FIG. 6B. This clockwise rotation of the lock gear 60 is transmitted through the input shaft 45, then through the inner cylinder 41 of the brake drum 40 and finally through the output drive shaft 50 so that through the meshed engagement between the gear on the output drive shaft 50 and the sector gear 25 (FIG. 1) the seat cushion 11 can be elevated towards the highest available seat position.

Continued upward pull of the handle 72 results in the finger 83 of the indexing member 80 interfering with the cam piece 91c of the second guide plate 91, causing the second cam member 92 to pivot clockwise about the pin 94 against the second coil spring 95 so that the finger 83 can slidingly pass through between the cam piece 91c and the second cam member 92 as shown in FIG. 6B.

Figure 7A:
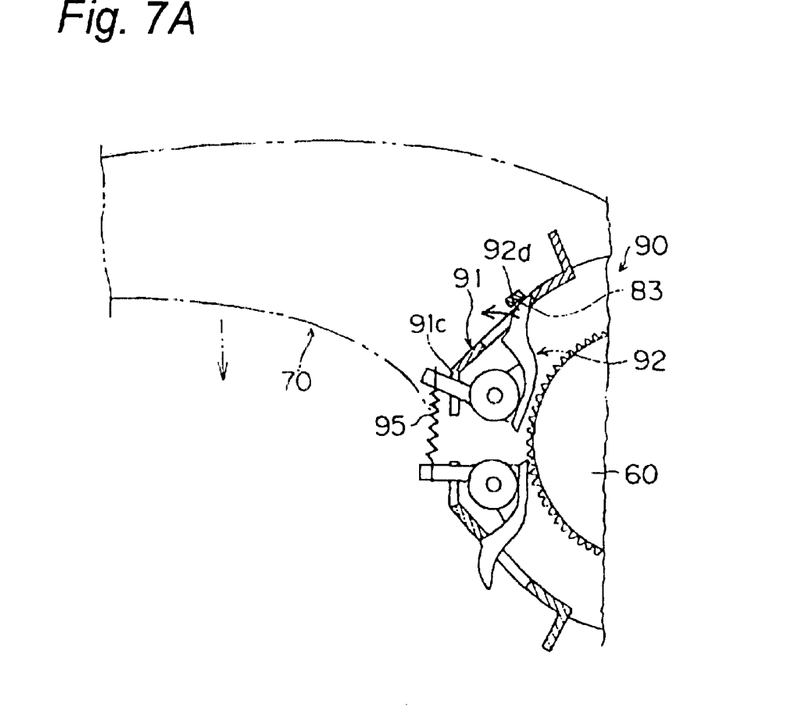
FIG. 7A shows a condition in which the operating lever is angularly moved to the highest position.
Figure 7B:
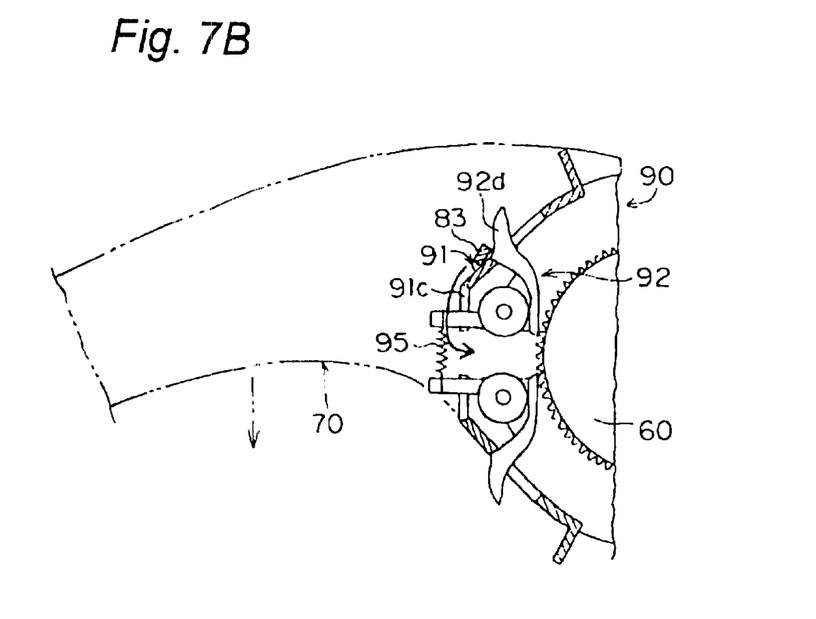
FIG. 7B shows a condition in which the operating lever is angularly moved in a rearward-going direction towards the neutral position.

Upon completion of the upward pull of the handle 72, the finger 83 of the indexing member 80 that has slide along the curved guide face 92e of the second cam member 92 and has subsequently pass underneath cam piece 91c, of the second guide plate 91 rides onto the flat guide face 92d of the second cam member 92 as shown in FIG. 7A. However, the moment the finger 83 rides onto the flat guide face 92d, the second cam member 92 is pivoted counterclockwise, as viewed in FIG. 7A, about the corresponding pin 94 by the effect of the biasing force of the second coil spring 95 that is greater than that of the first coil spring 86, causing the flat guide face 92d to push the finger 83 leftwards as viewed in FIG. 7A so as to ride onto the cam piece 91c of the second guide plate 91. In this condition, the indexing member 80 is pivoted about the supporting shaft 78 against the first coil spring 86 with the indexing plate 82 disengaged from the lock gear 60. As a result of this, the teeth 62 having been engaged in the corresponding catch slots 84 are disengaged therefrom.

Once the finger 83 is pushed onto the cam piece 91c of the second guide plate 91, the finger 83 slides therealong towards a position aligned with the gap 93. During this sliding motion of the finger 83 along the cam piece 91c of the second cam plate 91, the indexing member 80 is kept in the disengaged position with the teeth 62 of the lock gear 60 disengaged from the catch slots 84. Accordingly, no angular movement of the operating lever 70 is transmitted to the lock gear 60.

The moment the handle 72 returns to the neutral position upon completion of the latter half of the cycle, the finger 83 having slide along the cam piece 91c of the second cam plate 91 departs therefrom and falls into the gap 93 and, simultaneously therewith, the indexing member 80 urged by the first coil spring 86 is allowed to pivot about the supporting shaft 78 to assume the engaged position with the next succeeding some of the teeth 62 of the lock gear 60 engaged again in the catch slots 84 in the indexing member 80 substantially as shown in FIG. 6A.

By repeating the push and pull of the handle 72 cyclically, the lock gear 60 is intermittently driven clockwise about the input shaft 45 as viewed in FIG. 2 so that the seat cushion 11 can be elevated through the engagement between the sector gear 25 and the gear on the output drive shaft 50.

Where the seat cushion 11 is desired to be lowered, the operating lever 70 has to be moved from the neutral position towards the lowest position with the handle 72 cyclically pushed and pulled to allow the first cam member 82 to operate with the finger 83 in association with the first cam plate 91, so that the lock gear 60 and, hence, the output drive shaft 50 can be driven counterclockwise as viewed in FIG. 2.

The rotary feed mechanism 30 employing the ratcheting mechanism according to the foregoing embodiment of the present invention is of the construction wherein repeated operation of the operating lever 70 in one direction from the neutral position causes the output drive shaft 50, concentric with the pivotal center of the operating lever 70, to be rotated intermittently in one direction, while repeated operation of the operating lever 70 in the opposite direction causes the output drive shaft 50 to be rotated in the opposite direction. In this structure, the output drive shaft 50 is rotatable only when the operating lever 70 pivotable about an axis coaxial with the output drive shaft 50 is manipulated, but rotation of the output drive shaft 50 cannot be transmitted to the operating lever 70 because of the brake drum 40 operable to prevent the operating lever 70 from being angularly displaced in response to rotation of the output drive shaft 50. Specifically, rotation of the operating lever 70 in a forward-going direction from the neutral position through an incremental distance regardless of whether it is rotated from the neutral position towards the highest position or whether it is from the neutral position towards the lowest position, results in a corresponding rotation of the lock gear 60 and, hence, the output drive shaft 50 and, upon completion of the travel of the operating lever 70 through the incremental distance results in disengagement of the teeth of the lock gear 60 from the indexing plate, permitting the operating lever 70 to return in a rearward-going direction counter to that forward-going direction towards the neutral position. Thus, it will readily be seen that the ratcheting mechanism employed in the present invention has two operative positions, that is, engaged and disengaged position, wherein when the ratcheting mechanism is in the engaged position, e movement of the operating lever 60 can be transmitted to the output drive shaft 50, but when in the disengaged position, the operating lever 70 is allowed to return to the neutral position.

Accordingly, as compared with the mechanism in which because of the lock gear 60 provided externally of the brake drum 40 the output drive shaft 50 is intermittently driven by selective engagement and disengagement with some of internal teeth formed on an inner peripheral surface of the drum, the brake drum 40 employed in the present invention can have a reduced size, particularly a reduced diameter and, hence, the rotary feed mechanism as a whole can be assembled compact.

Also, the ratcheting mechanism discussed above is of the structure including the indexing plate 82 pivotally supported by the operating lever 70 through the supporting shaft and having the catch slots defined therein for engagement with some of the teeth of the lock gear 60 due to the biasing force of the first coil spring 86, and the release mechanism 90 operable to maintain engagement between some of the teeth of the lock gear 60 in the catch slots 84 in the indexing plate 82 during the angular movement of the operating lever 70 in the forward-going direction, but to disengage some of the teeth of the lock gear 60 from the catch slots 84. Accordingly, during the angular movement of the operating lever 70 in the forward-going direction the indexing member 80 is firmly engaged with the lock gear 60 with the catch slots 84 receiving therein some of the teeth of the lock gear 60 by the action of the first coil spring 86 to allow the angular movement of the operating lever 70 to be transmitted to the output drive shaft 50 over the angular distance corresponding to the incremental distance over which the operating lever 70 is moved, but upon completion of the angular movement of the operating lever 70 over the incremental distance, the operating lever 70 is allowed to return to the neutral position with the teeth of the lock gear 60 disengaged from the catch slots 84. During the disengagement of the teeth of the lock gear 60 from the catch slots 84 in the indexing mechanism, the output drive shaft 50 will not be rotated in a reverse direction because of the brake drum 40.

Thus, intermittent turn of the operating lever 70 from the neutral position in either direction results in a correspondingly intermittent rotation of the output drive shaft. However, when the operating lever 70 is intermittently turned from the neutral position towards the highest position, the output drive shaft 50 rotates correspondingly intermittently in one direction to elevate the seat cushion 11, but when it is intermittently turned from the neutral position towards the lowest position, the output drive shaft 50 rotates correspondingly intermittently in the opposite direction to lower the seat cushion 11.

The indexing plate 82 is provided with the finger 83 protruding from the free end thereof opposite to the U-shaped plate 81, and the release mechanism 90 has a construction including the cam members 92, which pivot about the respective pins 94 against the biasing force of the second coil spring 95 by the interference with the finger 83 when the operating lever 70 is angularly moved in the forward-going direction from the neutral position and pivots about the output drive shaft 50 with the indexing plate 82 having engaged with the lock gear 60, and the guide plate 91 which allows the indexing plate 82 to be pivoted about the supporting shaft by the interference with the finger 83 when the operating lever 70 is angularly moved in the rearward-going direction to disengage the teeth of the lock gear 60 from the catch slots 84. Accordingly, the angular movement of the operating lever 70 in the forward-going direction causes the finger 83 of the indexing plate 82 against the biasing force of the second coil string 95 to pivot the cam members 92 about the respective pins, whereby the slide of the finger 83 along the cam member 92 causes the lock gear 60, then engaged with the indexing plate 82, to be rotated to thereby rotate the output drive shaft 50 in the predetermined direction.

In the condition in which the operating lever 70 has been angularly moved the maximum distance in the forward-going direction, since the biasing force of the second coil spring 95 is set to be greater than that of the first coil spring 86, the cam member 92 can pivot about the shaft in the reverse direction and, thus, the pivot of the indexing plate 82 about the supporting shaft through the finger 83 results in disengagement of the lock gear 60 from the catch slots 84. Then, in this condition, the angular movement of the operating lever 70 in the rearward-going direction causes the finger 83 to be guided by the guide plate 91 to return the operating lever 70 back to the original neutral position while the indexing plate 82 is kept disengaged from the lock gear 60 and, hence, without allowing the output drive shaft 50 to rotate.

In this way, the release mechanism 90 includes the cam members 92 operable to rotate the output drive shaft 50 in connection with the indexing plate 82 at the time the operating lever 70 is turned in the forward-going direction from the neutral position, and the guide plate 91 operable not to rotate the output drive shaft 50 in connection with the indexing plate 82 at the time of the operating lever 70 is turned in the rearward-going direction, whereby the repeated manipulation of the operating lever 70 in the forward-going direction and then in the rearward-going direction counter to the forward-going direction allows the output drive shaft 50 to be rotated only in the predetermined direction with a simplified structure.

Figure 8A:
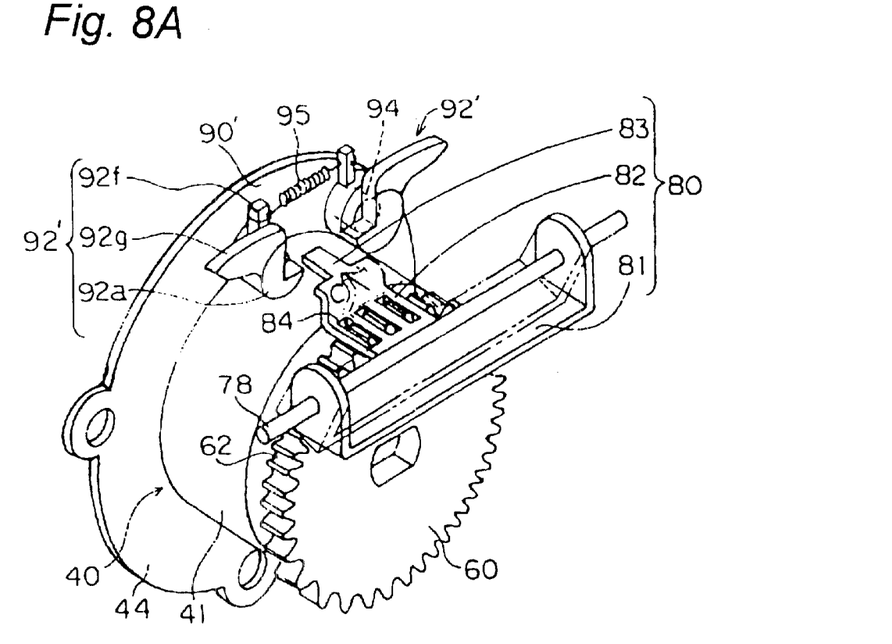
FIG. 8A is a perspective view showing a guide cam and a lock member.
Figure 8B:
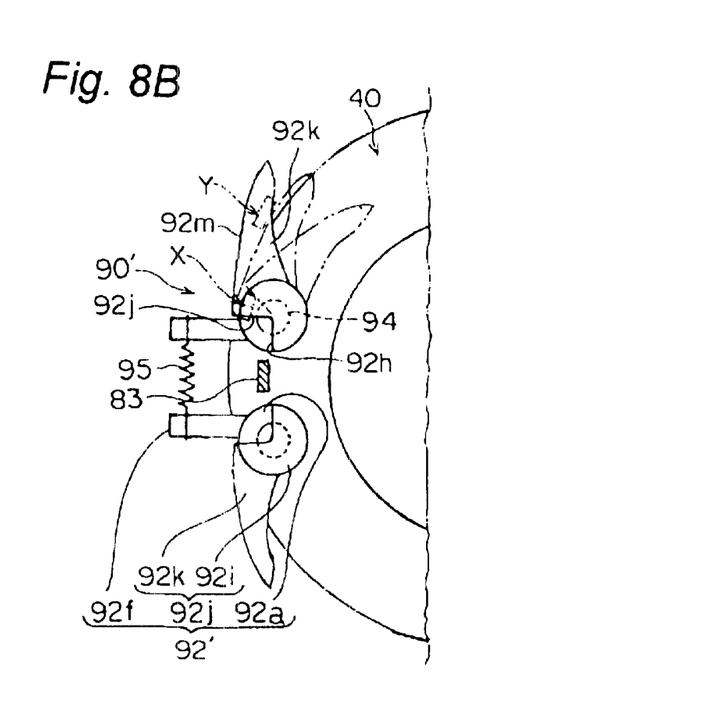
FIG. 8B is a view of the guide cams taken along a direction shown by the arrow C in FIG. 8A.

FIGS. 8A and 8B illustrate a second embodiment of the ratcheting mechanism employed in the present invention, wherein FIG. 8A is a perspective view showing cam members 92' and the indexing member 80, and FIG. 8B is a view of the cam members 92' taken in a direction shown by the arrow C in FIG. 8A. As shown in FIGS. 8A and 8B, the ratcheting mechanism includes the indexing member 80 of the structure described in connection with the first embodiment and the cam members 92', but the guide plate 91 which has been employed in the first embodiment is not employed. In other words, the release member 90 employed in the second embodiment of the present invention includes only the cam members 92'.

Each of the cam member 92' includes a cylindrical piece 92a rotatably supported about the pin 94 secured to the annular flange 44 of the brake drum 40 as with the first embodiment, a spring catch bar 92f protruding from the corresponding cylindrical piece 92a as with the first embodiment, and a third guide piece 92g provided integrally at the position of the cylindrical piece 92a opposite to the spring catch bar 92f.

The third guide piece 92g one for each of the cam members 92' includes a non-interfering piece 92i having a parallel surface 92h lying parallel to the supporting shaft 78 used to connect the indexing member 80 to the operating lever 70 (FIG. 1) so long as the operating lever 70 is held at the neutral position, which parallel surface 92h does not interfere the finger 83 of the indexing plate 82 even when the operating lever 70 is operated in the forward-going direction, and an interfering piece 92k having a cross surface 92j which lies perpendicular to the non-interfering pieces 92i and interferes the above-mentioned finger 83 when the operating lever 70 is turned in the forward-going direction.

The interfering piece 92k has a length so chosen that when the operating lever 70 is turned about 80% of the incremental distance of angular movement thereof, the interfering piece 92K can be brought into abutment against the finger 83. The interfering piece 92k also has a second parallel surface 92m which lies approximately perpendicular to the cross surface 92j and extends in a direction opposite to the associated spring catch bar 92f. The second parallel surface 92m has a length sufficient to allow the finger 83 not to be disengaged from the second parallel surface 92m even when the operating lever 70 has been completely turned over the incremental distance in the forward-going direction.

According to the ratcheting mechanism of the second embodiment, so long as the operating lever 70 is held at the neutral position, the finger 83 is located between the pair of third guide pieces 92g as shown in FIG. 8B, and the catch slots 84 of the indexing plate 82 are engaged with some of the teeth 62 of the lock gear 60 as shown in FIG. 8A. Therefore, as the operating lever 70 is angularly moved in the forward-going direction towards, for example, the highest position, the lock gear 60 is rotated in response to the movement of the indexing member 80 about the input shaft 45 then rotating together with 51 the operating lever 70, without the third guide pieces 92g being rotated about the pin 94 until the finger 83 abuts against the cross surfaces 92j, and accordingly the output drive shaft 50 rotates in one direction.

Continued movement of the operating lever 70 in the forward-going direction from the neutral position causes the finger 83 to urge against the cross surfaces 92*j*, whereby the third guide piece 92*g* shown on an upper side of FIG. 8B is pivoted clockwise about the pin 94 as viewed therein, thereby assuming a position shown by the phantom line X of FIG. 8B.

Further movement of the operating lever 70 in the forward-going direction causes the finger 83 to move from a top end side of the cross surface 92*j* to the second parallel surface 92*m* of the interfering piece 92*k*, thereby assuming a position shown by the phantom line Y of FIG. 8B. When this condition is exhibited, the biasing force of the second coil spring 95 having been set to be greater than that of the first coil spring 86 (FIG. 4) causes the third guide piece 92*g* to be pivoted counterclockwise about the pin 94, whereby the pivoting of the indexing member 80 about the supporting shaft 78 causes the engagement of the indexing plate 82 with the lock gear 60 to be released, so that the operation of the operating lever 70 does not reach through the lock gear 60 to the output drive shaft 50.

In this condition, the turn of the operating lever 70 in the rearward-going direction toward a lower side in FIG. 8B causes the finger 83 to be moved toward a lower side in FIG. 8B while sliding over the second parallel surface 92*m*, and then leave the second parallel surface 92*m*, with the finger 83 consequently returning back to the original position shown by the solid line in FIG. 8B. Therefore, repeating the reciprocation of the operating lever 70 toward an upper side, that is, towards the highest position, causes the output drive shaft 50 to be rotated intermittently in one direction required to elevate the seat cushion 11 towards the highest available seat position, while reciprocating operation of the operating lever 70 toward a lower side, that is, towards the lowest position causes the output drive shaft 50 to be rotated in the other direction required to lower the seat cushion 11 towards the lowest available seat position.

According to the ratcheting mechanism of the second embodiment, the guide plate 91 need be employed and, therefore the cost of manufacture of the rotary feed mechanism can correspondingly be reduced.

Figure 9A:
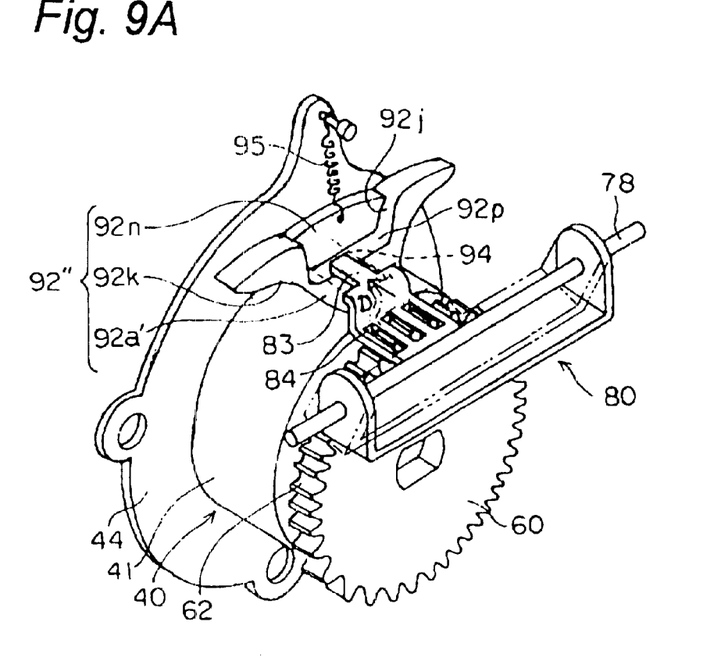
FIG. 9A is a perspective view showing a guide cam and a lock member.
Figure 9B:
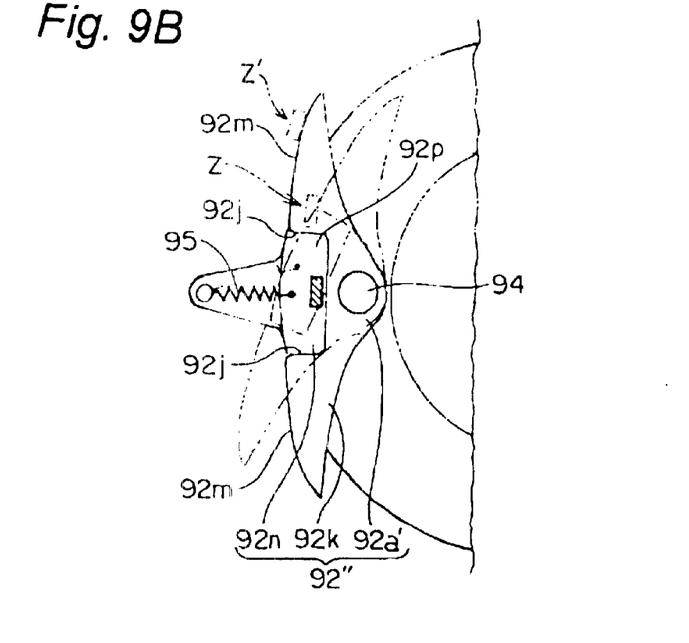
FIG. 9B is a view of the guide cams taken in a direction of the arrow D in FIG. 9A.

FIGS. 9A and 9B illustrate a third embodiment of the ratcheting mechanism that can be employed in the present invention, wherein FIG. 9A is a perspective view showing cam members 92" and the indexing member 80, and FIG. 9B is a view of the cam members 92" taken in a direction shown by the arrow D in FIG. 9A. As shown in FIGS. 9A and 9B, the ratcheting mechanism of the third embodiment includes the indexing member 80 similar to that used in the first embodiment and the cam members 92" uniquely employed in the third embodiment. In this third embodiment, the guide plate 91 employed in the first embodiment is not employed and, in addition, only one cam member 92" is employed. The other construction is similar to that of the second embodiment. That is, even in the third embodiment, the release mechanism 90 is formed of only the cam members 92".

Specifically, the cam member 92" used in the third embodiment as shown in FIG. 9A has an integrated shape in which the pair of the cam members 92' formed linear symmetrically in the second embodiment are shared with one cylindrical piece 92*a*. That is, such cam member 92"consists of one semi-cylindrical piece 92*a*' which corresponds to the above-mentioned cylindrical piece 92*a* and assumes a semi-cylindrical shape when viewed from the front, a pair of interfering pieces 92*k* extending from the semi-cylindrical piece 92*a*' in a direction generally radially of the brake drum 40, and a covering piece 92*n* for covering the gap between opposed surfaces of the interfering pieces 92*k* at a location opposite to the finger 83. The semi-cylindrical piece 92*a*' is rotatably supported about the pin 94 provided in the flange portion 44.

The semi-cylindrical piece 92*a*' is supported by the pin 94 for rotation reversibly in directions opposite to each other about the pin 94 secured to the flange 44 of the brake drum 40, corresponding to the finger 83. The outer surface of a portion equivalent to the chord of the semi-cylindrical piece 92*a*' located in the gap between the pair of interfering pieces 92*k* is formed with an arcuate surface 92*p* with the input shaft 45 as the center and equivalent to the parallel surface 92*h* in the second embodiment. The arcuate surface 92*p* is sized such that the finger 83 in a state in which the indexing plate 82 is set to the engaged position abuts thereagainst, and that about 80% of the moving-forth of the operating lever 70 causes the finger 83 not to reach the cross surface 92*j* of the interfering pieces 92*k*.

The second coil spring 95 extends between a lug integral with the annular flange 44 and the covering piece 92*n* and lies in alignment with a line drawn to pass the axis of the pin 94, and the biasing force of the second coil spring 95 is utilized to the cam member 92" at a neutral position at which the finger 83 is located intermediate of the arcuate surface 92*p*.

With the cam member 92" used in the third embodiment, so long as the operating lever 70 is set to the neutral position as shown in FIG. 9B, the finger 83 is located intermediate of the arcuate surface 92*p* of the semi-cylindrical piece 92*a*' and, as shown in FIG. 9A, the catch slots 84 of the indexing plate 82 receive therein some of the teeth 62 of the lock gear 60. Therefore, operating the operating lever 70 in the forward-going direction, for example, towards an upper side of FIG. 9 causes the lock gear 60 to be rotated about the input shaft 45 together with the indexing member 80 about the input shaft 45 then rotating together with the operating lever 70, without the cam member 92" being rotated about the pin 94 until the finger 83 abuts against the cross surfaces 92*j* of the interfering piece 92*k* and, accordingly, the output drive shaft 50 rotates in one direction.

Continued turn of the operating lever 70 in the forward-going direction causes the finger 83 to urge against the cross surfaces 92*j*, whereby the interfering cam 92*k* on the upper side of FIG. 9B is pivoted clockwise about the pin 94, thereby assuming a position shown by the phantom line Z in FIG. 9B.

Further turn of the operating lever 70 in the forward-going direction causes the finger 83 to be moved from the top end side of the cross surfaces 92*j* to the second parallel surface 92*m* of the interfering piece 92*k*, thereby exhibiting a position shown by the phantom line Z' in FIG. 9B. When this condition is assumed, the biasing force of the second coil spring 95 having been set to be greater than that of the first coil spring 86 (FIG. 4) causes the interfering piece 92*k* to be pivoted counterclockwise about the pin 94, whereby the pivoting of the indexing member 80 about the supporting shaft 78 disengages the indexing plate 82 from the lock gear 60, so that the turn of the operating lever 70 is not transmitted through the lock gear 60 to the output drive shaft 50.

In this condition, turn of the operating lever 70 in the rearward-going direction, that is, towards a lower side in FIG. 9B causes the finger 83 to be moved toward the lower side in FIG. 9B while sliding over the second parallel surface 92*m*, and then leave the second parallel surface 92*m*, thereby returning back to the original position shown by the solid in FIG. 9B. Therefore, repeating the reciprocating operation of the operating lever 70 toward the upper side causes the output drive shaft 50 to be rotated in one direction, while reciprocating operation of the operating lever 70 toward the lower side causes the output drive shaft 50 to be rotated in the other direction.

According to the ratcheting mechanism of the third embodiment, the guide plate 91 of the first embodiment need not be used, and further two cam members as with the first and second embodiments need not be used, thereby attributing to the reduction in the parts cost further than the second embodiment.

The present invention is not limited to the above-mentioned embodiments and is intended to cover the following subject matters.

(1) Although in the above-mentioned embodiments, the release mechanism 90 is mounted to the flange of the brake drum 40, the present invention is not limited to the mounting of the release mechanism 90 to the flange portion 44. For example, an annular plate may be fixed to a surface of the outer cylinder 41 of the brake drum opposite to the lock gear 60 and the release mechanism 90 may be attached to the annular plate.

(2) Although in the above-mentioned embodiments, the teeth 62 are provided over the full circumference on the outer surface of the lock gear 60, the present invention is not limited to the providing of the teeth 62 over the full circumference on the outer surface of the lock gear 60. For example, the engaging teeth 62 may be provided only on the portion corresponding to the incremental distance over which the seat cushion 11 shown in FIG. 1 can be elevated or lowered.

(3) Although in the above-mentioned embodiments, the rotary feed mechanism 30 of the output drive shaft 50 is applied to the incremental distance over which the seat cushion 11 is elevated or lowered, the rotary feed mechanism 30 of the present invention is not limited to the incremental distance of elevation or lowering of the seat cushion 11, but may be applied to various devices that are desired to be intermittently rotated in response to repeated angular movement of the operating lever 70.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A rotary feed mechanism comprising:
    a brake drum having input and output shafts and operable to drivingly couple the input and output shafts together to rotate the input and output shafts in unison with each other only when the input shaft is driven regardless of the direction in which the input shaft is rotated;
    an operating lever mounted on the input shaft of the brake drum and supported for rotation from a neutral position in first and second directions opposite to each other about a longitudinal axis of the input shaft; and
    a ratcheting mechanism intervening between the operating lever and the brake drum and operable to permit rotation of the input shaft only when the operating lever is angularly moved from the neutral position in any one of the first and second directions, but to lock the input shaft during angular movement of the operating lever back to the neutral position;
    said ratcheting mechanism comprising:
        a lock gear having gear teeth and mounted on the input shaft for rotation together therewith;
        an indexing plate supported so as to be angularly movable between engaged and disengaged positions about an axis lying substantially perpendicular to a longitudinal axis of the input shaft, said indexing plate when in the engaged and disengaged positions being engaged and disengaged with and from some of the gear teeth of the lock gear, respectively; and
        a release mechanism carried by the brake drum for releasing the indexing plate from the engaged position to allow the operating lever to be returned to the neutral position.

2. The rotary feed mechanism as claimed in claim 1, further comprising a first biasing spring for normally urging the indexing plate to the engaged position to allow the angular movement of the operating lever to be transmitted to the input shaft through the lock gear, said release mechanism being operable against the first biasing spring to release the indexing plate;
    wherein the indexing plate is supported by the operating lever by means of a support shaft defining such axis substantially perpendicular to the input shaft and has an array of parallel catch slots defined therein for engagement with some of the gear teeth of the lock gear; and
    wherein the release mechanism includes a guide means for guiding the indexing plate to permit some of the gear teeth to be engaged in the corresponding catch slots during the angular movement of the operating lever in one of the first and second directions from the neutral position, but to be disengaged from the catch slots during the angular movement of the operating lever back to the neutral position.

3. The rotary feed mechanism as claimed in claim 2, wherein the indexing plate has a finger extending therefrom in a direction laterally of a plane of rotation of the lock gear and towards the release mechanism;
    the guide means includes a second biasing spring, a cam element urged in one direction by the second biasing spring and pivotable against the second biasing spring upon engagement with the finger during the angular movement of the operating lever from the neutral position to permit the indexing plate to be angularly moved from the engaged position, said first cam member being returned back to an initial position by the second biasing spring in response to return of the operating lever back towards the neutral position, and a guide element engageable with the finger during a return movement of the operating lever back to the neutral position to keep the indexing plate at the disengaged position; and
    wherein the second biasing spring has a biasing force greater than that of the first biasing spring.

4. The rotary feed mechanism as claimed in claim 1, further comprising a seat height adjusting mechanism for adjustably elevating or lowering a seat assembly relative to a floor, and wherein the output shaft of the brake drum is drivingly coupled with the seat height adjusting mechanism.

* * * * *